United States Patent Office 2,944,297
Patented July 12, 1960

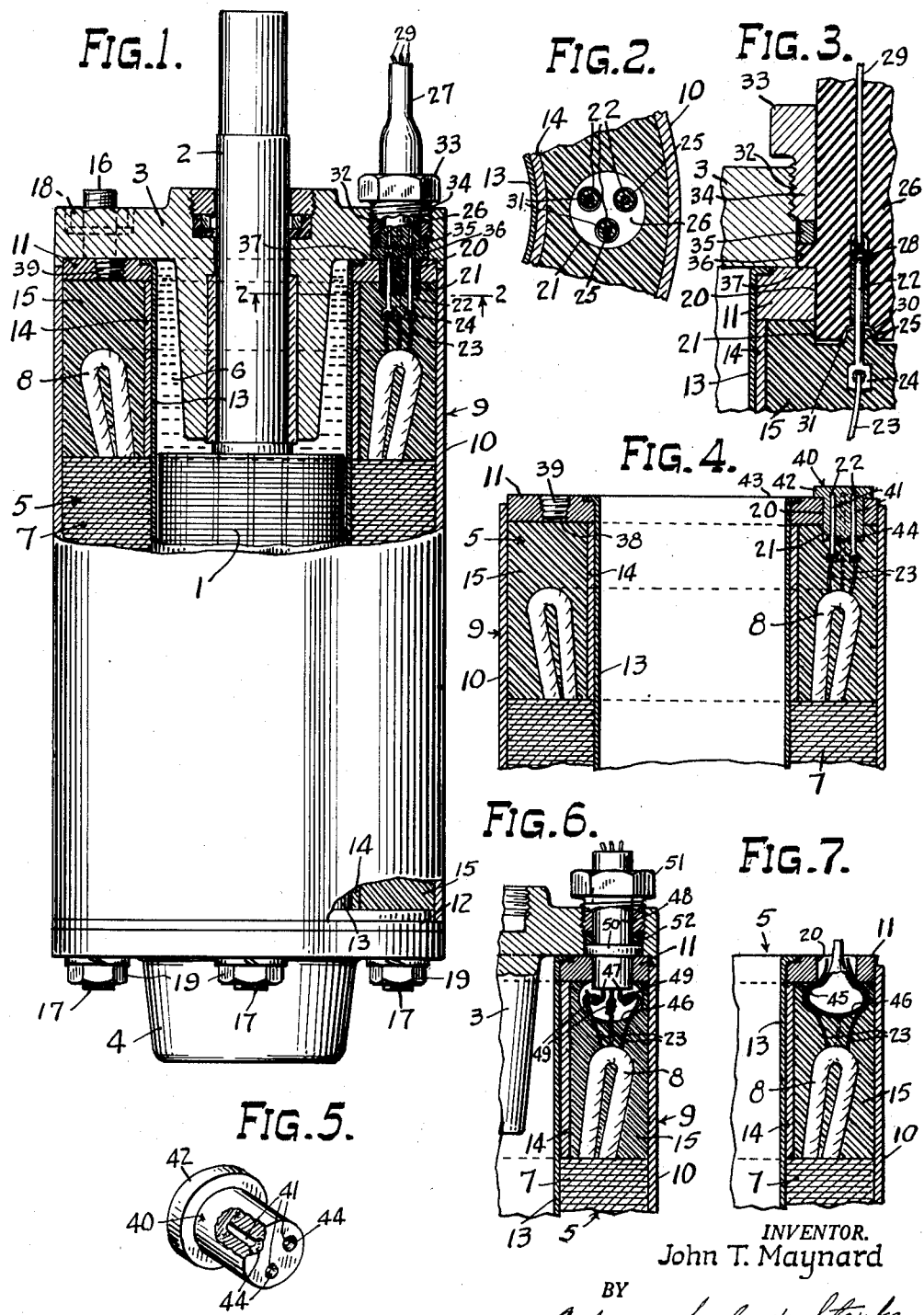

---

2,944,297

METHOD OF FORMING A POWER LEAD CONNECTION FOR PLASTIC POTTED STATOR WINDINGS

John T. Maynard, West Allis, Wis., assignor to A. O. Smith Corporation, Milwaukee, Wis., a corporation of New York Filed Sept. 3, 1957, Ser. No. 681,596

9 Claims. (Cl. 18—59)

This invention relates to a method of forming a power lead connection for an enclosed stator winding which is embedded within a plastic material and which is adapted to be submerged within a liquid.

In submersible motors and the like, the stator core and winding carried thereby may be conventionally enclosed within a hermetically sealed casing to prevent any liquid from reaching the stator winding. This is necessary to prevent shorting of the winding and resultant destruction thereof. It is also conventional to fill the stator enclosure with a thermosetting resin or other suitable filler which may set to a hardened mass. The resin or the like provides good heat transfer from the winding to the surrounding liquid and therefore allows greater power input to the winding.

To provide a power connection to the stator winding, an opening is necessarily provided within the stator casing. This opening must, of course, be positively sealed to prevent liquid leakage therethrough.

Present satisfactory seals are quite complicated and expensive.

The present invention provides a simple sealed lead connection which maintains a positive seal over long periods of time.

In accordance with the present invention, during the potting or curing of the stator filler material, a removable sealing member is inserted within the lead-in opening in the stator enclosure. The surface of the member exposed to the potting material is of a suitable material to which the potting material does not adhere and therefore permits easy removal of the sealing member after the potting material is set.

In one embodiment of the invention, a connector is employed having releasably engaging members connected to the field winding and to the incoming power leads. The hardened filler supports the connecting members which are connected to the field winding. The removable sealing member is provided with engaging means to position these connecting members during the hardening of the filler.

In another form of the invention, the sealing member forms a recess within the filler immediately adjacent the lead opening. The leads from the stator winding are withdrawn from the stator and directly and permanently connected to the incoming power leads having a sealing plug portion. When the sealing portion is inserted, the leads fold-up within the recess formed in the filler material.

The drawing furnished herewith illustrates the best mode presently contemplated by the inventor for carrying out the invention.

In the drawing:

Figure 1 is an elevational view of a submersible motor with parts broken away to show the power lead connection.

Fig. 2 is an enlarged fragmentary view taken on line 2—2 of Fig. 1;

Fig. 3 is an enlarged fragmentary view of the power lead connection of Fig. 1;

Fig. 4 is a fragmentary view of the stator shown in Fig. 1 during the curing process;

Fig. 5 is a perspective view of the sealing plug employed in Fig. 4;

Fig. 6 is a fragmentary view of a submersible motor stator illustrating a second embodiment of the invention; and Fig. 7 is a view similar to Fig. 4 of the stator section shown in Fig. 6 during the curing process.

Referring to the drawings and particularly to Fig. 1, a submersible motor is illustrated having a conventional squirrel cage variety rotor 1 carried on a shaft 2 for rotation therewith. The shaft 2 is journaled at opposite ends within an upper sleeve bearing housing 3 and a lower sleeve and thrust bearing housing 4 to rotatably support the rotor 1 within the bore of an annular stator assembly 5.

A suitable liquid 6 may be disposed within the rotor chamber to maintain lubrication of the bearings 3 and 4. This is permissible because the conventional rotor is not adversely affected by liquids other than for possible corrosion which may be substantially eliminated by suitable selection of the liquid 6.

The stator assembly 5 includes a conventional laminated annular magnetic core 7 which carries a field winding 8 within a plurality of longitudinal slots, not shown. The core 7 and winding 8 are supported within a casing 9 to protect the winding 8 from contact with liquid. The casing 9 includes an outer shell 10 which serves as the outer frame of the motor and which has the stator core 7 attached thereto. An upper end ring 11 and a lower end ring 12 are brazed or otherwise hermetically secured to the opposite ends of the motor casing 10 and a thin inner liner 13 is brazed or otherwise hermetically secured to the inner peripheral surface of the end rings to hermetically enclose the field winding 8. Annular backing plates 14, only one of which is shown in full, extends one each from the end rings 11 and 12 to the adjacent axial stator core faces. The plates 14 support the liner 13 which is made as thin as practicable to establish a small air gap between the rotor 1 and the stator core 7.

A suitable hardened filler 15 completely fills the voids within the stator casing to carry the heat from the winding 8 to the surrounding liquid, not shown, during motor operation. The filler 15 may be any material or mixture of materials adapted to transport the heat from the winding to the surrounding well liquid, not shown, and which will polymerize from a low viscous state to a solid mass. Polyester and expoxy resins are presently quite generally employed in potted submersible stator assembly.

The bearing housings 3 and 4 are secured to the respective upper and lower end rings 11 and 12 by cooperating bolts 16 and 17 and corresponding clamping nuts 18 and 19 to position the rotor 1 in operative relation with the stator assembly 5.

The upper end ring 11 is provided with an opening 20 in alignment with a recess 21 in the plastic filler 15 to accommodate three connector pins 22 which are connected directly to the field winding 8 by three leads 23 and provide for a three-phase power connection thereto.

Each pin 22 includes a connecting head 24 to which a lead 23 is soldered or otherwise secured. The connecting head 24 is embedded in the hardened filler material 15 to rigidly support the corresponding connecting pin 22. A small filler embossment 25 surrounds each of the contact pins 22 to establish a high dielectric path between the pins. The pins 22 are arranged in laterally spaced relation in accordance with three sockets in a cylindrical socket member 26 of rubber or the like which is integrally formed on the end of a power cable 27.

Each socket contains a tubular electrical contact 28 connected to a lead 29 of the power cable. Each contact 28 snugly engages a terminal 22 to establish a sound releasable electrical connection from the leads of the power cable 27 to the field winding 8.

A recess 30 is formed in the end of the socket member 25 adjacent the electrical contacts 28, generally corresponding in shape to the embossments 25. When the socket member 26 is secured in place, a small air space 31 is normally formed between the end of the socket member 25 and the plastic filler 15. The cooperating recesses 30 and embossments 25 establish a relatively long air path between the contact pins 22 and therefore a long dielectric path which effectively prevents all arcing between contact pins.

The upper bearing housing 3 also includes a threaded opening 32 in alignment with and somewhat larger than lead-in opening 20 to permit extension of the socket member 26 therethrough. A hexagonal nut 33 is carried by the incoming socket member 26 and has an externally threaded neck 34 adapted to thread into opening 32. A ring spacer 35 is disposed between the end of the neck 34 and a rubber-like flange 36 which is integrally formed about the periphery of end of socket member 26. The flange 36 is substantially the same diameter as the opening 32 in the upper bearing housing 3 and rests on the upper surface 37 of the upper end ring 11 when the socket member 26 is inserted through the aligned openings 20 and 32. The hex nut 33 is tightly threaded into the threaded opening and the flange 36 flows laterally to positively seal the opening. The ring spacer 35 provides a bearing surface upon which the nut 33 may turn without transmitting a twisting or torque action onto the rubber flange 36.

Referring to Fig. 4, a view of the stator assembly 5 is shown separated from the other motor components and in condition for the curing or setting of the plastic filler 15. A threaded tapered opening 38 is provided in the upper stator end ring 11 through which the uncured plastic 15 is inserted into the stator assembly. A threaded tapered plug 39 is threaded into the opening after the filler 15 has been inserted therein and seals the opening.

A sealing plug member 40 is removably disposed within the lead-in opening 20 in the upper end ring 11 and protrudes inwardly into the stator assembly. The plug member 40 has three sockets 41 in the inner end thereof to receive and locate the three terminals 22. An upper flange 42 on the member 40 engages the upper surface 43 of the end ring 11 and determines the protrusion of the plug member into the stator chamber to form a predetermined recess 21.

Referring to Figs. 4 and 5, the three sockets 41 in the plug member 40 are shown each having a diameter substantially in accordance with and in the shape of a terminal 22. The three sockets 41 are arranged in the same relative spacing as the sockets in socket member 26. The depth of the sockets 41 locates the upper end of the three pins 22 such that the socket member 26 may be inserted into opening 20 with the flange 36 resting on the upper surface of the upper end ring 11 and tubular contacts 28 releasably engaging pins 22. The sockets 41 are countersunk as at 44 to form the embossments 25.

The plug member 40 is formed of a waxy polymer employed as mold release agents such as nylon, polyethylene or fluorocarbons or similar material to which the plastic filler 15 does not appreciably adhere or bond during the curing process. Therefore, plug member 40 may be readily removed from the end ring opening 20 after the plastic filler 15 is cured to a solid mass without distorting the location and shape of the terminals 22.

The socket member 26 is then inserted through the opening 20 and the hex nut 33 drawn up to releasably connect the winding to the power cables 27 with a positive seal of the lead-in opening 20.

Referring to Fig. 6, a fragmentary view of a stator assembly is shown with an alternative embodiment of the invention. In this embodiment, a balloon-like member 45 is disposed within the stator assembly adjacent the opening 20 and connected to a source of fluid, not shown. The balloon-like member is formed of material similar to plug 40 and is blown up to a recess 46 within the plastic filler adjacent the opening 20. The leads 23 from the winding 8 extend outwardly through the opening during the curing process with the wall of the balloon member 45 engaging the inner edge of the opening 20 and sealing the opening. After the filler 15 has completely set, the balloon member 45 is deflated and removed.

The stator assembly 5 is then connected together with the rotor and the motor bearing with the connecting leads 23 extending outwardly through the aligned openings.

The insulated leads 23 are spliced or otherwise securely connected one each to one of three incoming insulated leads 47 extending from a cylindrical sealing member 48. The joint is provided with a suitable coating of insulation such that leads 23 wind or curl up within the recess 46 in the plastic filler 15 as the plug member 48 is placed with the opening 20, as shown at 49. The sealing member 48 is provided with an integral collar 50 which rests on the upper surface of ring 11 when member 48 is inserted into the aligned openings 20 and 32. The sealing member 48 also carries a hexagonal nut 51 and ring spacer 52 which forces the encircling flange 50 into sealing engagement with the upper surface of end ring 11, similar to the seal of Figs. 1–4.

The present invention provides a simple, low cost method of providing a power connection to the field winding of submersible motors and the like.

Various modes of carrying out the invention are contemplated as being within the scope of the following claims particularly pointing out and distinctly claiming the subject matter which is regarded as the invention.

I claim:

1. In the method of forming a power lead connection in a potted stator assembly including an outer hermetically enclosing casing having an opening through which incoming power leads are adapted to be connected to the field winding, sealing the opening with a member extending into the casing, said member having a substantially non-adhering surface adjacent the potting material and supporting the lead means from said field winding with the leads extending outwardly of the plastic, curing the potting material to a solid mass, and removing the sealing plug to permit connection of incoming power leads to the lead means and sealing of the opening to hermetically enclose the stator and field winding.

2. In the method of potting a stator assembly including an outer hermetically enclosing casing, providing an opening in the casing through which field power terminals are connected to a source of power by a releasable socket member, sealing the opening with a plug having a surface adjacent the potting material which surface does not readily bond with the potting material, curing the potting material, said plug engaging the power terminals and holding said terminals in a predetermined spaced relation with a portion of the terminals within the plastic during the curing of the potting material to embed the field winding end of the terminals in the material, and removing the plug subsequent to the curing of the potting material to define a recess with the terminals supported within the potting material and adapted to releasably accommodate the socket member.

3. The method of forming a releasable power connection to a plastic potted winding disposed within a hermetically sealed casing having an opening to connect an incoming power cable to the winding, said connection including cooperative contact members connected to the power cable and the field winding, which comprises sealing the opening with a tubular sealing plug extending axially into the casing, said sealing plug having a surface engaging the uncured plastic to which the plastic is substantially non-bondable, arranging the contact members connected to said field winding in cooperating spaced relation with the engageable portions thereof disposed within correspondingly arranged sockets in the sealing plug and with inner supporting portions of the members held within the uncured plastic, curing said potting plastic, and removing said plug to allow insertion of an incoming power plug having contact members adapted to releasably engage the potted contact members.

4. A method of potting a winding within a thermosetting plastic, said winding having at least one rod-shaped terminal adapted to releasably engage a complementing rod-shaped terminal on an incoming power line, which comprises providing an enclosure for said winding having an opening through which said terminals may be engaged and disengaged, arranging a plastic surfaced member to which the potting plastic does not appreciably adhere within said opening, said plug having at least one opening adapted to engage said rod-like terminal and hold the same in longitudinal alignment with the opening with an inner portion of the terminal within the uncured plastic, curing the plastic to a solid state to embed the winding therein and to support said terminal, and removing said plastic member.

5. The method of potting a winding within a thermosetting plastic, said winding having a plurality of rod-like connecting terminals arranged to cooperate with an incoming power connecting socket member, which comprises enclosing said winding within a hermetically enclosing casing having an opening through which an incoming power plug is releasably engaged with said connecting terminals, disposing a plug having a surface within said opening selected from the group consisting of nylon, polyethylene and solid fluorocarbon, said plug having spaced rod-like recesses arranged in accordance with the opening in the socket member adapted to receive said connecting terminals to support the terminals with an inner portion of the terminals within the uncured plastic, curing said plastic to a solid mass to rigidly support the terminals, and removing said plug from said opening to establish a recess to receive said socket member.

6. The method of forming a power connecting means for a three phase winding potted within an annular hermetically enclosing casing, which comprises forming an opening in an end wall of said casing to permit connection of the incoming power socket, securing three rod-like terminals to said winding by leads of a length to allow positioning of the terminals through the opening, assembling the rod-like terminals within openings in the end of a plug having an outer surface selected from the group consisting of nylon, polyethylene and solid fluorocarbon with the terminals projecting from said plug openings a predetermined distance to allow supporting of the terminals within a plastic, pressing said plug into said opening to locate the three terminals within the casing opening with the inner ends of the terminals within the casing, said plug openings being arranged in accordance with corresponding terminal means in said power socket and supporting the terminals during potting of the winding, potting a plastic resin filler within the casing to completely fill the voids within the casing with a solid plastic, and removing said plug from said casing opening, said terminals being embedded within the cured plastic and rigidly supported with the casing thereby.

7. The method of forming a power connection to a winding embedded in a potting material within a hermetically enclosing casing, which comprises forming an opening in said casing, extending connecting leads from said winding through the opening, sealing the opening with a member extending into said casing to form a recess in the potting material adjacent the opening, said member having a surface to which the potting material is essentially non-adhering, curing a potting material in said casing, and removing said member to establish a lead receiving recess in the potting material within the casing.

8. The method of forming a power lead connection to a winding which is potted in accordance with claim 7 wherein said sealing member is formed of a polymer selected from the group consisting of nylon, polyethylene and solid fluorocarbon.

9. The method of forming a power lead connection to a winding potted in a plastic resin within a hermetically enclosing casing having a power lead opening, which comprises withdrawing insulated connecting leads through the opening, disposing a balloon member within the casing adjacent the opening, inflating the balloon member to seal the opening and to separately seal a portion of the casing volume immediately adjacent the opening, filling the casing with a thermosetting resin, curing the resin to a solid mass, deflating and removing the balloon member from within the casing to provide a recess within the casing, and inserting a sealing member having the power leads passing therethrough into said opening to seal the opening with the connecting lead winding within the recess formed by the ballon member.

References Cited in the file of this patent
UNITED STATES PATENTS

| | | |
|---|---|---|
| 1,333,044 | Vaughn | Mar. 9, 1920 |
| 1,584,502 | Apple | May 11, 1926 |
| 1,763,115 | Wermine | June 10, 1930 |
| 2,692,675 | Land et al. | Oct. 26, 1954 |
| 2,707,801 | Gard | May 10, 1955 |
| 2,747,756 | Hartop et al. | May 29, 1956 |

FOREIGN PATENTS

| | | |
|---|---|---|
| 760,717 | Great Britain | Nov. 7, 1956 |
| 65,491 | Switzerland | Aug. 22, 1913 |